United States Patent [19]

Bastetti et al.

[11] Patent Number: 4,992,290

[45] Date of Patent: Feb. 12, 1991

[54] EGG-BASED CREAM FOR INDUSTRIAL SCALE CONFECTIONERY PRODUCTION

[75] Inventors: Giuseppe Bastetti, Milan; Claudio Russo, Modena; Maria L. Solzi, Parma, all of Italy

[73] Assignee: Barilla G. E.R. F.LLI - Societa' Per Azioni, Parma, Italy

[21] Appl. No.: 275,474

[22] Filed: Nov. 23, 1988

[30] Foreign Application Priority Data

Mar. 24, 1988 [IT] Italy ................................ 19923 A/88

[51] Int. Cl.⁵ ...................... A23L 1/0522; A23L 1/09; A23L 1/32
[52] U.S. Cl. .................................... 426/572; 426/549; 426/553; 426/558; 426/613; 426/659; 426/661
[58] Field of Search ............... 426/658, 659, 661, 549, 426/553, 558, 613, 572

[56] References Cited

U.S. PATENT DOCUMENTS

| | | | |
|---|---|---|---|
| 2,970,918 | 2/1961 | Petersen | 426/659 |
| 3,726,690 | 4/1973 | Schuppner, Jr. | 99/139 |
| 4,229,489 | 10/1980 | Chiu et al. | 426/578 |
| 4,582,711 | 4/1986 | Durst | 426/128 |
| 4,610,884 | 9/1986 | Lewis, III et al. | 426/613 |
| 4,636,397 | 1/1987 | Brown | 426/579 |
| 4,707,374 | 11/1987 | King et al. | 426/659 |
| 4,761,292 | 8/1988 | Augustine et al. | 426/659 |

FOREIGN PATENT DOCUMENTS 543003 1/1985 Australia .
1306384 2/1973 United Kingdom .

*Primary Examiner*—Donald E. Czaja
*Assistant Examiner*—Helen Pratt
*Attorney, Agent, or Firm*—Sughrue, Mion, Zinn, Macpeak & Seas

[57] ABSTRACT

A fresh egg-based cream including milk and sugar is prepared with appropriate amounts of monosaccharides and modified and partly hydrated amylopectin. This cream, having a low Aw value, a sufficiently long shelf life at room temperature, and a suitable mellowness, has shown to suit particularly well industrial scale confectionery production methods.

8 Claims, No Drawings

EGG-BASED CREAM FOR INDUSTRIAL SCALE CONFECTIONERY PRODUCTION

DESCRIPTION

This invention relates to an egg-based cream for industrial scale confectionery production, and more particularly, a hydrated cream composed of freshly laid eggs (yolks) for direct use with confectionery produced on industrial scale and specifically as a filling for bakery products.

A standard cream for confectionery use is basically comprised of eggs, sugar, and milk, optionally additivated with flour or a corn starch to thereby attain on cooking a most appropriate consistency for ultimate consumption.

Such a cream is a kind of product referred to as freshly prepared which is very short lasting, its preservability usually not exceeding one day, due to its being highly unstable and liable to undergo organoleptic deterioration at a fast rate.

Of the most frequently occurring causes of instability of the creams under consideration, a major one results from the growth of bacteria and microorganisms.

It is mainly on account of this marked instability, which makes it quickly perishable at room temperature and even at cool temperatures, that egg-based cream of the hydrated type for confectionery applications has only been prepared and used heretofore on an artisan scale.

The problem underlying this invention is to provide an inalterable cream of the hydrated type, prepared from freshly laid eggs, both under the sanitary and organoleptic aspects, over a sufficiently long time span and at room temperature, to thereby find widespread and advantageous application to the production of confectionery on industrial scale.

In order to meet the requirements of such an application, a cream of the kind under consideration should:

(i) have an adequate consistency to permit easy handling through machinery, such as on its being combined with a confectionery product by co-extrusion or the like operations;

(ii) but not a too thick consistency because it should exhibit throughout its shelf life, on the end product with which it associates, a comparable softness to that of a freshly prepared cream;

(iii) have a water activity Aw within a range of values which are sure to inhibit the growth of pathogenic and degrading microorganisms and to retain that Aw value throughout a desired shelf life period;

(iv) have an overall moisture content which is not too low, in order for the end product not to lose gradually its soft character during shelf life; and (v) have such rheological characteristics as to prevent its flattening into a thin layer when combined with some cookie or the like confectionery product and then baked (at a high temperature and for a relatively long time) along with it, and let the cream retain its "swell".

Fulfilment of all these and other conditions is recognized to be hindered by that those components which qualify the cream organoleptically, specifically freshly laid eggs and milk, also tend to impart an excessively flowing consistency and high Aw values to the cream.

All the aspects listed hereinabove of the aforesaid technical problem are solved according to the invention by that said cream comprises, in parts by weight:

4 to 15 parts of a humectant selected from the group of the monosaccharides;

4 to 6 parts of amylopectin modified with acetic and adipic functional groups; and 3 to 6 parts of proteins from egg yolk and milk; said cream having a pH within the 4 to 5 range, an Aw value within the 0.7 to 0.8 range, and a moisture content of between 16% and 23%.

The monosaccharides, which are used as preferred humectants, have the important function of bonding the moisture contained in the cream so as to control the value of Aw to within the 0.7 to 0.8 range.

At these values of Aw, the growth of pathogenic or degrading microorganisms, without any significant loss in the target mellowness thereof.

Further, the monosaccharides effectively resist the undesired elastic character that egg yolk tends to impart to the cream, and for this reason, as well as for their inherent organoleptic properties, they have been chosen among all the eligible humectants for use in this invention.

It has been found that in order for the monosaccharides to perform their functions effectively, the amount of them used should exceed 4 parts by weight on the total weight of the cream, and that larger amounts than 15-16 parts by weight bring about no increased effectiveness.

The preferred monosaccharides may be either used alone or as appropriate mixtures thereof. It is advantageous, in general, to use glucose syrup as the source of monosaccharides. The preferred glucose syrup has a dextrose content of at least 10%. Also suitable are syrups rich in fructose, maltodextrins admixed to 10 DE (dextrose equivalent) syrups in amounts as high as 2% of the cream total.

A very important and characterizing factor is the use of amylopectin modified with acetic and adipic functional groups to impart to the cream of this invention, and then retain throughout the shelf life thereof, the desired consistency.

More specifically, and according to a fundamental aspect of this invention, the amount of modified amylopectin used includes a first portion formed of hot gelling modified amylopectin, and a second portion formed of cold gelling modified amylopectin, in a 2:3 ratio.

Also, the modified amylopectin should not be fully hydrated upon use in the mixture.

It is common practice in the confectionery art to disperse the flour starches through an acqueous medium in order to gel them thoroughly, and it is only after they have fully gelled that they are admixed to the other solid ingredients of the cream.

It has been found that, where the modified amylopectin is fully gelled, it would impart a hard consistency to the egg-based cream of this invention.

And a hard consistency cream would be unsuited to achieve the objects set forth.

The cold gelling portion of the modified amylopectin gives the cream the required cold-working consistency for convenient processing on machinery.

The other portion of the modified amylopectin is hot gelled during the cream cooking process. However, this shall only be a partial gelling using up some of the available free water in the cream, with the net result that the cream consistency is increased slightly, but no more than enough, to make it fit for co-extrusion. However, the primary function of the last-mentioned portion of the modified amylopectin not fully gelled is to retain the cream swell during the baking of the cookie with which said cream has been associated.

The protein content of the inventive cream mainly comes from the egg yolk and milk.

For a proper balance of the cream according to the invention, of its stability and properties, it has been found that it is preferable and beneficial to provide such proteins in a ratio of proteins from the milk to proteins from the egg yolk within the range of 2.3/1.1 to 3.8/2.2.

For improved stability of the cream, its pH should be in the 4 to 5 range, which value can be attained by the use of an appropriate acid such as citric acid (or lemon juice), ascorbic acid, tartaric acid, and the like.

An exemplary preparation of a freshly laid egg-based cream of the hydrated type, according to the invention, will be given herein below, in which all the parts used are parts by weight.

EXAMPLE 22 parts of vegetable margarine, 34 parts of sugar, 6.3 parts of skim milk powder, and 0.7 parts of lemon solids as acidifier and flavorant, were mixed together. The mixing step was protracted for two minutes to ensure a most homogeneous distribution of the components throughout the mass.

5 parts of an amylopectin modified with adpic and acetic groups where then added. In particular, in this amylopectin, 3.1 parts were made up of cold gelling modified amylopectin, and 2.4 parts of hot gelling modified amylopectin. Mixing was maintained for another 2 minutes, whereafter 18 parts new milk and 11 parts egg yolk were added. Mixing was carried on for 2 more minutes, and the mixture was then additivated with 5.6 parts glucose syrup and 9.6 parts fructose syrup.

A protracted slow mixing action was maintained until an emulsion was obtained which was then cooked while stirring. Cooking was accomplished by heating for 30 minutes to a top temperature of 75° to 80° C., whereafter the mixture was cooled under stirring down to room temperature within 45 minutes.

The egg-based cream yielded was mellow and showed good swell and organoleptic qualities which were quite comparable with those of a similar cream prepared with artisan methods.

It showed optimum consistency, as subsequent steps of co-extrusion and molding with a cookie paste demonstrated.

After baking (at temperatures in the 180° to 230° C. range for 7 to 11 minutes) the hydrated cream based on freshly laid eggs, according to the invention, which formed the (enclosed) filling of the resulting cookies, showed good swell and mellowness, in sharp contrast with the crisp character of the enclosing cookie.

Such favorable results were also confirmed by other preparations with freshly laid egg-based cream according to the invention, the recipes wherefor varied between the respective values listed herein below.

| Proteins from natural milk | 0.20–0.40 |
| Proteins from powdered milk | 2.1–3.4 |
| Proteins from egg yolk | 1.1–3.4 |
| Fats from natural milk | 0.1–0.20 |
| Fats from powdered milk | 0.50–0.70 |
| Fats from egg yolk | 2.1–4.2 |
| Non-hydrogenated vegetable fats | 16–18.5 |
| Carbohydrates, as sucrose | 20.5–28 |
| Carbohydrates, as monosaccharides | 3–15.5 |
| Carbohydrates, as polysaccharides | 0–5.4 |
| Modified amylopectin | 4–6 |
| Carbohydrates, from lactose | 3.5–5.6 |
| Carbohydrates, from egg yolk | 0.07–0.10 |

The cream-stuffed cookies of this invention were shelved away at room temperature, and tested after seven, forty, and ninety days respectively; the tests results are shown in the following chart.

| End Product EP (cookie product stuffed with the hydrated freshly laid egg-based cream of the invention) | After 7 days | After 40 days | After 90 days |
| --- | --- | --- | --- |
| Residual moisture (%) in the cream | 13–15 | 13–15 | 12–13 |
| Aw of the cream in the EP | 0.65–0.67 | 0.65–0.67 | 0.65–0.67 |
| Residual moisture (%) in the EP | 9.5–10.5 | 9.5–10.5 | 9.5–10.5 |
| Aw of the EP | 0.60 | 0.65–0.70 | 0.65–0.70 |
| pH | 4.7 | 4.7–4.8 | 4.7–4.8 |

It is apparent from the above test data that the product does afford the degree of overall stability sought from the chemical and microbiological standpoints, while retaining such values and relative stability for an average life period of at least 3 months.

After 90 days at room temperature, the filling of egg-based cream still showed to be swollen, mellow, and organoleptically acceptable, so as to be quite comparable with that of the newly made cookie.

It should be noted that these highly favorable results in the respect of bacteriological deterioration, migration of the cream outwards, phenomena of cream discoloration due to problems brought about by enzymes and oxidation, alteration of the flavoring components, separation of such phases as fat . from the solid part and generic fat, could be obtained with the a paste forming the outer enclosure of cookies filled with fresh egg-based cream having the following composition:

| Added anhydrous fat | 18–22% |
| Fat from the eggs | 0.5–0.6% |
| Fat from the milk | 0.45–0.50% |
| Sucrose | 19–20% |
| Lactose | 0.6–0.7% |
| Monosaccharides | 0.4–0.5% |
| Vegetable proteins from the flour | 5–5.5% |
| Proteins from the eggs | 0.5–0.6% |
| Proteins from the milk | 0.45–0.5% |
| Starch from the flour | 33–34% |
| Added water | 4–6% |
| Water from the eggs | 3.5–4% |
| Water from the milk | 0.9–1.0% |

We claim:

1. An egg-based cream for industrial scale confectionery production comprising, in parts by weight:

4 to 15 parts of one or more monosaccharides as a humectant;

4 to 6 parts of amylopectin modified with acetic and adipic functional groups; and 3 to 6 parts of protein obtained from egg yolk and milk; said cream having a pH within the 4 to 5 range, an Aw value within the 0.7 to 0.8 range, and a moisture content of between 16% and 23%.

2. A cream according to claim 1, wherein said humectant is selected from a group consisting of glucose syrup, fructose syrup, and mixtures thereof.

3. A cream according to claim 1, wherein said modified amylopectin comprises hot gelled amylopectin and cold gelled amylopectin.

4. A cream according to claim 3, wherein said modified and hot gelled amylopectin and said modified and cold gelled amylopectin are in a 2:3 ratio.

5. A cream according to claim 1, wherein the proteins from milk and from egg yolk are in a 2.3/1.1 to 3.8/2.2 ratio by weight.

6. An egg-based cream of hydrated type for industrial scale confectionery production, comprising in parts by weight:

| proteins from natural milk | 0.20–0.40 |
| proteins from powdered milk | 2.1–3.4 |
| proteins from egg yolk | 1.1–3.4 |
| fats from natural milk | 0.1–0.20 |
| fats from powdered milk | 0.50–0.70 |
| fats from egg yolk | 2.1–4.2 |
| non-hydrogenated vegetable fats | 16–22 |
| carbohydrates, as sucrose | 20.5–28 |
| carbohydrates, as monosaccharides | 3–15.5 |

-continued

| carbohydrates, as polysaccharides | 0–5.4 |
| modified amylopectin | 4–6 |
| carbohydrates, from lactose | 3.5–5.6 |
| carbohydrates, from egg yok | 0.07–0.10 |

7. A bakery product including a cream filling, wherein said filling consists of a cream as claimed in claim 6.

8. A cookie product comprising an enclosure on the outside and a filling on the inside thereof, wherein said inside filling consists of a cream as claimed in claim 6, and wherein said outside enclosure has the following composition (with percentages by weight):

| added anhydrous fat | 18–22% |
| fat from the eggs | 0.5–0.6% |
| fat from the milk | 0.45–0.50% |
| sucrose | 19–20% |
| lactose | 0.6–0.7% |
| monosaccharides | 0.4–0.5% |
| vegetable proteins from flour | 5–5.5% |
| proteins from the eggs | 0.5–0.6% |
| proteins from the milk | 0.45–0.5% |
| starch from the flour | 33–34% |
| added water | 4–6% |
| water from the eggs | 3.5–4% |
| water from the milk | 0.9–1.0% |

* * * * *